US009670827B2

(12) United States Patent
Taliaferro

(10) Patent No.: US 9,670,827 B2
(45) Date of Patent: Jun. 6, 2017

(54) PRE-CHAMBER

(71) Applicant: GE Oil & Gas Compression Systems, LLC, Houston, TX (US)

(72) Inventor: Jason Taliaferro, Edmond, OK (US)

(73) Assignee: GE Oil & Gas Compression Systems, LLC, Houston, TX (US)

( * ) Notice: Subject to any disclaimer, the term of this patent is extended or adjusted under 35 U.S.C. 154(b) by 25 days.

(21) Appl. No.: 14/934,144

(22) Filed: Nov. 5, 2015

(65) Prior Publication Data

US 2016/0061094 A1 Mar. 3, 2016

Related U.S. Application Data

(63) Continuation of application No. 13/975,270, filed on Aug. 23, 2013, now Pat. No. 9,222,402, which is a continuation of application No. 12/920,827, filed as application No. PCT/US2009/035021 on Feb. 24, 2009, now Pat. No. 8,544,443.

(60) Provisional application No. 61/036,041, filed on Mar. 12, 2008.

(51) Int. Cl.
| | |
|---|---|
| F02B 19/10 | (2006.01) |
| F02B 19/12 | (2006.01) |
| F02B 19/00 | (2006.01) |
| F02B 43/04 | (2006.01) |

(52) U.S. Cl.
CPC .......... *F02B 19/1009* (2013.01); *F02B 19/00* (2013.01); *F02B 19/1014* (2013.01); *F02B 19/1095* (2013.01); *F02B 19/12* (2013.01); *F02B 43/04* (2013.01); *Y02T 10/125* (2013.01); *Y02T 10/146* (2013.01); *Y02T 10/32* (2013.01)

(58) Field of Classification Search
CPC .. F02B 19/1023; F02B 19/10; F02B 19/1019; F02M 25/03
See application file for complete search history.

(56) References Cited

U.S. PATENT DOCUMENTS

| 1,539,133 A | 8/1920 | Markle et al. |
| 1,660,424 A | 2/1928 | Modersohn |
| 1,962,079 A | 6/1934 | Kegresse |
| (Continued) | | |

FOREIGN PATENT DOCUMENTS

| CA | 2196234 | 8/1997 |
| DE | 936546 | 12/1955 |
| (Continued) | | |

OTHER PUBLICATIONS

PCT International Search Report and Written Opinion for PCT/US2009/035021, dated Sep. 2, 2009.
(Continued)

*Primary Examiner* — Long T Tran
(74) *Attorney, Agent, or Firm* — Mintz Levin Cohn Ferris Glovsky and Popeo, P.C.

(57) ABSTRACT

A pre-chamber is provided. In one embodiment, the pre-chamber is part of a two-stroke combustion engine having a cylinder head with a sparkplug receptacle that has a generally frustoconical shape, and the pre-chamber is coupled to the sparkplug receptacle. The pre-chamber may include a cooling jacket with a generally frustoconical shape and a combustion chamber having an upper zone and a lower zone, which may be narrower than the upper zone.

19 Claims, 7 Drawing Sheets

(56) References Cited

U.S. PATENT DOCUMENTS

| | | | |
|---|---|---|---|
| 2,148,505 A | 2/1939 | Rosen | |
| 2,316,269 A * | 4/1943 | Maruhn | F02B 9/00 |
| | | | 123/260 |
| 2,454,512 A | 11/1948 | Heymann | |
| 2,622,570 A | 12/1952 | Nallinger | |
| 2,647,497 A * | 8/1953 | Stump | F02B 19/00 |
| | | | 123/253 |
| 2,708,601 A * | 5/1955 | Links | F02M 61/06 |
| | | | 123/294 |
| 2,761,431 A | 9/1956 | Nallinger | |
| 2,799,256 A | 7/1957 | Stump | |
| 3,025,839 A | 3/1962 | Aubre et al. | |
| 3,058,452 A | 10/1962 | Espenschied | |
| 3,063,434 A | 11/1962 | Haas | |
| 3,082,751 A | 3/1963 | Lucien | |
| 3,682,146 A | 8/1972 | Mozokhin et al. | |
| 3,682,147 A | 8/1972 | Irgens | |
| 3,738,333 A | 6/1973 | Vogelsang | |
| 3,895,614 A | 7/1975 | Bailey | |
| 3,919,984 A | 11/1975 | Yagi et al. | |
| 3,954,089 A | 5/1976 | Hardesty et al. | |
| 3,980,059 A | 9/1976 | Noguchi et al. | |
| 3,999,532 A | 12/1976 | Kornhauser | |
| 4,000,731 A | 1/1977 | Noguchi et al. | |
| 4,022,168 A | 5/1977 | Sprague | |
| 4,074,664 A | 2/1978 | Rollins | |
| 4,091,772 A | 5/1978 | Heater et al. | |
| 4,098,232 A | 7/1978 | Gleiter | |
| 4,106,444 A * | 8/1978 | Deutschmann | F02F 1/4214 |
| | | | 123/193.5 |
| 4,127,096 A | 11/1978 | Townsend | |
| 4,142,500 A | 3/1979 | Davis | |
| 4,215,657 A | 8/1980 | Burgio | |
| 4,224,902 A | 9/1980 | Binder et al. | |
| 4,303,045 A | 12/1981 | Austin, Jr. | |
| 4,306,526 A | 12/1981 | Schaub et al. | |
| 4,332,223 A | 6/1982 | Dalton | |
| 4,380,978 A | 4/1983 | Maynard, Jr. et al. | |
| 4,542,724 A | 9/1985 | Blais | |
| 4,545,344 A | 10/1985 | Matuo | |
| 4,892,070 A | 1/1990 | Kuhnert | |
| 4,966,103 A | 10/1990 | Schaub et al. | |
| 5,012,777 A | 5/1991 | Baker et al. | |
| 5,024,193 A | 6/1991 | Graze, Jr. | |
| 5,050,375 A | 9/1991 | Dickinson | |
| 5,076,229 A | 12/1991 | Stanley | |
| 5,095,869 A | 3/1992 | Blaser et al. | |
| 5,105,781 A | 4/1992 | Fortnagel et al. | |
| 5,203,298 A | 4/1993 | Manolis | |
| 5,293,851 A | 3/1994 | Schaub | |
| 5,417,189 A | 5/1995 | Regueiro | |
| 5,505,172 A | 4/1996 | Heitland et al. | |
| 5,555,867 A | 9/1996 | Freen | |
| 5,555,868 A | 9/1996 | Neumann | |
| 5,662,082 A | 9/1997 | Black et al. | |
| 5,678,517 A | 10/1997 | Chen et al. | |
| 5,724,731 A | 3/1998 | Black et al. | |
| 5,775,288 A | 7/1998 | Suzuki et al. | |
| 5,778,849 A | 7/1998 | Regueiro | |
| 5,791,374 A | 8/1998 | Black et al. | |
| 5,829,407 A | 11/1998 | Watson et al. | |
| 5,915,351 A | 6/1999 | Regueiro | |
| 5,927,244 A | 7/1999 | Yamauchi et al. | |
| 6,019,081 A | 2/2000 | Divecha et al. | |
| 6,055,955 A | 5/2000 | Benedikt et al. | |
| 6,079,081 A | 6/2000 | Padiak et al. | |
| 6,223,715 B1 | 5/2001 | Suzuki | |
| 6,279,516 B1 | 8/2001 | Haugen et al. | |
| 6,341,591 B1 | 1/2002 | Tsutsumi et al. | |
| 6,513,483 B2 | 2/2003 | Riggs | |
| 6,659,065 B1 | 12/2003 | Renegar | |
| 6,708,666 B2 | 3/2004 | Roberts, Jr. | |
| 7,216,623 B2 | 5/2007 | Teraji et al. | |
| 7,270,107 B2 | 9/2007 | Riggs | |
| 7,353,797 B1 | 4/2008 | Breidenthal | |
| 7,584,739 B2 | 9/2009 | Takahashi et al. | |
| 7,628,130 B2 | 12/2009 | Johng | |
| 7,637,239 B2 | 12/2009 | Gagliano et al. | |
| 8,050,848 B2 | 11/2011 | Huschenbett et al. | |
| 8,567,369 B2 | 10/2013 | Johnson | |
| 8,844,498 B2 | 9/2014 | Patterson | |
| 8,910,612 B2 | 12/2014 | Woo et al. | |
| 2002/0104507 A1 | 8/2002 | Riggs | |
| 2002/0114985 A1 | 8/2002 | Shkolnik et al. | |
| 2005/0051130 A1 | 3/2005 | Lampard | |
| 2006/0096570 A1 | 5/2006 | Tourteaux et al. | |
| 2007/0221164 A1 | 9/2007 | Ashida et al. | |
| 2013/0000596 A1 | 1/2013 | Diaz Escano | |

FOREIGN PATENT DOCUMENTS

| | | |
|---|---|---|
| DE | 1401947 | 12/1968 |
| DE | 3709976 | 10/1988 |
| DE | 3913665 | 10/1990 |
| GB | 448739 | 6/1936 |
| GB | 942169 | 11/1963 |
| GB | 2310008 A | 8/1997 |
| WO | WO 96/28647 | 9/1996 |

OTHER PUBLICATIONS

SG Written Opinion for Application No. 201005399-9 dated Apr. 15, 2011.

GB Examination Report for Application No. GB1016596.7 dated Jan. 25, 2012.

GB Examination Report for Application No. GB1016596.7 dated Jul. 13, 2012.

GB Examination Report for Application No. GB1218646.6 dated Nov. 15, 2012.

GB Examination Report for Application No. GB1218643.3 dated Nov. 15, 2012.

* cited by examiner

PRE-CHAMBER

CROSS REFERENCE TO RELATED APPLICATION

This application claims priority to and benefit of U.S. Non-Provisional patent application Ser. No. 13/975,270, entitled "Pre-Chamber", filed on Aug. 23, 2013, which is herein incorporated by reference in its entirety, which claims priority to and benefit of U.S. Non-Provisional patent application Ser. No. 12/920,827, entitled "Pre-Chamber", filed on Sep. 2, 2010, which is herein incorporated by reference in its entirety, which claims priority to and benefit of PCT Application No. PCT/US2009/035021 entitled "Pre-Chamber", filed on Feb. 24, 2009, which is herein incorporated by reference in its entirety, and which claims priority to and benefit of U.S. Provisional Patent Application No. 61/036,041, entitled "Pre-Chamber", filed on Mar. 12, 2008, which is herein incorporated by reference in its entirety.

FIELD OF THE INVENTION

The present invention relates generally to combustion engines. More particularly, the present invention relates to pre-chambers for combustion engines.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Engine design has changed in response to environmental regulations, as government agencies enforce increasingly stringent limits on engine emissions. Starting in 2008, the United States Environmental Protection Agency will further restrict the levels of nitrogen oxides (NOx), carbon monoxide (CO), and non-methane hydrocarbon (NMHC) emitted by certain types of combustion engines. To meet these requirements, many types of engines now include pre-chambers. These devices ignite the fuel-air mixture inside the engine's cylinders with a flame from secondary combustion inside the pre-chamber. During the compression stroke of the engine, the pre-chamber is loaded with a relatively rich fuel-air mixture. To initiate combustion, this richer fuel-air mixture is ignited in the pre-chamber, rather than ignition being initiated by directly igniting the leaner fuel-air mixture in the cylinder. The resulting flame propagates from the pre-chamber into the cylinder, combusting the fuel in the cylinder more completely, and more rapidly, producing fewer undesirable emissions.

Many engines built prior to the adoption of recent environmental regulations do not include pre-chambers, and generally do not address emissions-related concerns. As a result, there is a large installed base of engines that may not satisfy newer emissions regulations. Replacing these installed engines with newer designs that include pre-chambers to reduce emissions would be expensive. Accordingly, to control emissions, for instance, it would be useful to find a way to retrofit the older engines with pre-chambers. Older engines, however, often do not have sufficient space above the cylinder heads to receive a pre-chamber, as the cylinder heads were designed with relatively small sparkplug wells to couple directly to spark plugs, which are typically smaller than pre-chambers.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," "said," and the like, are intended to mean that there are one or more of the elements. The terms "comprising," "including," "having," and the like are intended to be inclusive and mean that there may be additional elements other than the listed elements. The use of "top," "bottom," "above," "below," and variations of these terms is made for convenience, but does not require any particular orientation of the components.

Figure 1:
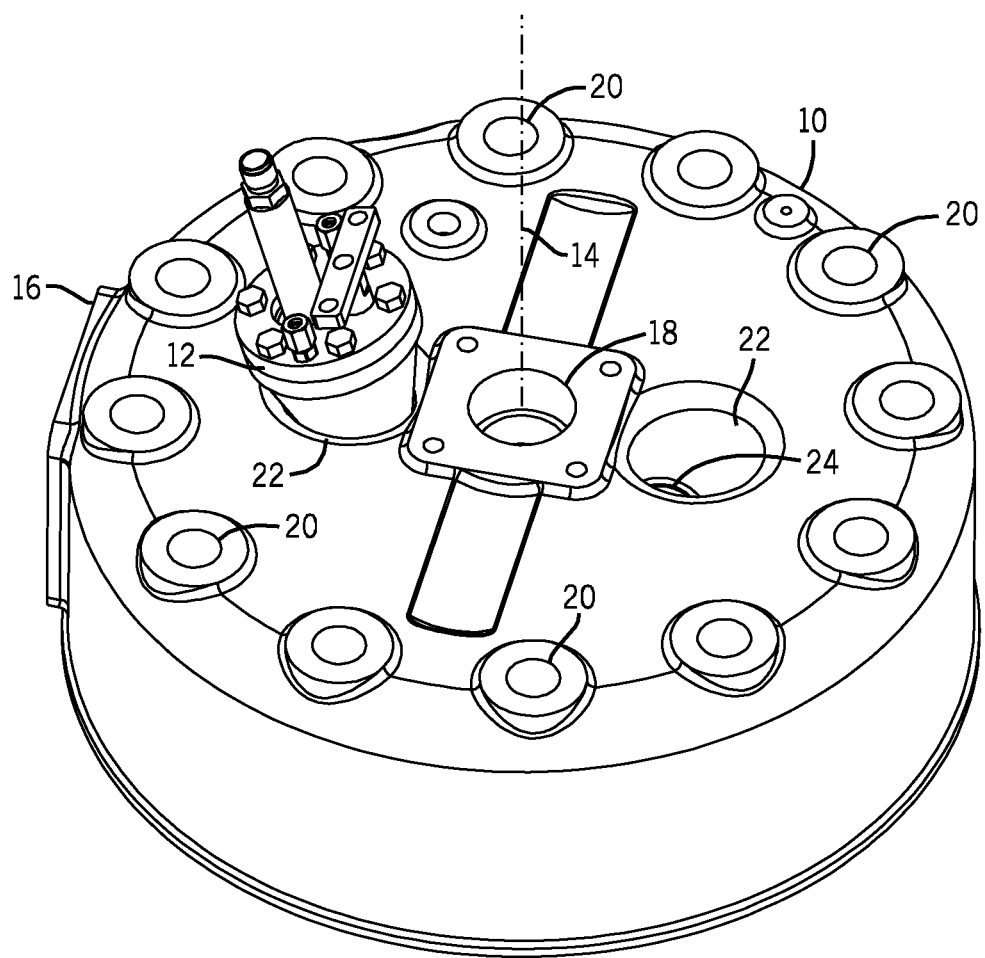
FIG. 1 is a perspective view of a cylinder head and a pre-chamber in accordance with an embodiment of the present technique.

FIG. 1 illustrates an example of a cylinder head 10 and a pre-chamber 12. As explained below, the cylinder head 10 is representative of a style of cylinder head used on two-stroke engines that were not designed to include a pre-chamber. The pre-chamber 12, however, is configured to couple to this style of cylinder head and retrofit older engines, lowering the emissions of these engines and potentially extending their useful life. The pre-chamber 12 is described in greater detail below, after describing features of the cylinder head 10.

The exemplary cylinder head 10 has a generally right cylindrical shape that is generally concentric about a central axis 14, and the head 10 includes a coolant inlet 16, a gas inlet 18, a plurality of bolt holes 20, and a sparkplug receptacle 22. The cylinder head 10 may be made of cast or machined steel, or other appropriate materials; and it may be configured to couple to a cylinder of a two-stroke engine.

The cylinder head 10 is configured to receive several fluid flows. As explained below with reference to FIG. 2, the cylinder head 10 may include generally hollow sidewalls that are in fluid communication with the coolant inlet 16 to enable circulation of a coolant. The gas inlet 18 is shaped to couple to a gas-injection valve that injects fuel, such as methane or other constituents of natural gas, into the cylinder. The illustrated gas inlet 18 is generally centrally located on the cylinder head 10 and is generally concentric about the central axis 14.

The bolt holes 20 are generally evenly distributed around the outer radius of the cylinder head 10 and extend through the cylinder head 10 generally parallel to the central axis 14. Bolts extending through the bolt holes 20 secure the cylinder head 10 to a cylinder, which may also be generally concentric about the central axis 14.

The illustrated cylinder head 10 includes two sparkplug receptacles 22 that are generally reflectively and rotationally symmetric to each other. Although only one of the illustrated sparkplug receptacles 22 is connected to a pre-chamber 12, a pre-chamber 12 may be connected to each sparkplug receptacle 22. The sparkplug receptacles 22 are configured to receive a sparkplug and position an electrode of the sparkplug inside the cylinder. A threaded aperture 24 at the base of each sparkplug receptacle 22 is shaped to mate with external threads on the sparkplug. Other embodiments may include more or fewer sparkplug receptacles 22 or engagement mechanisms.

Figure 2:
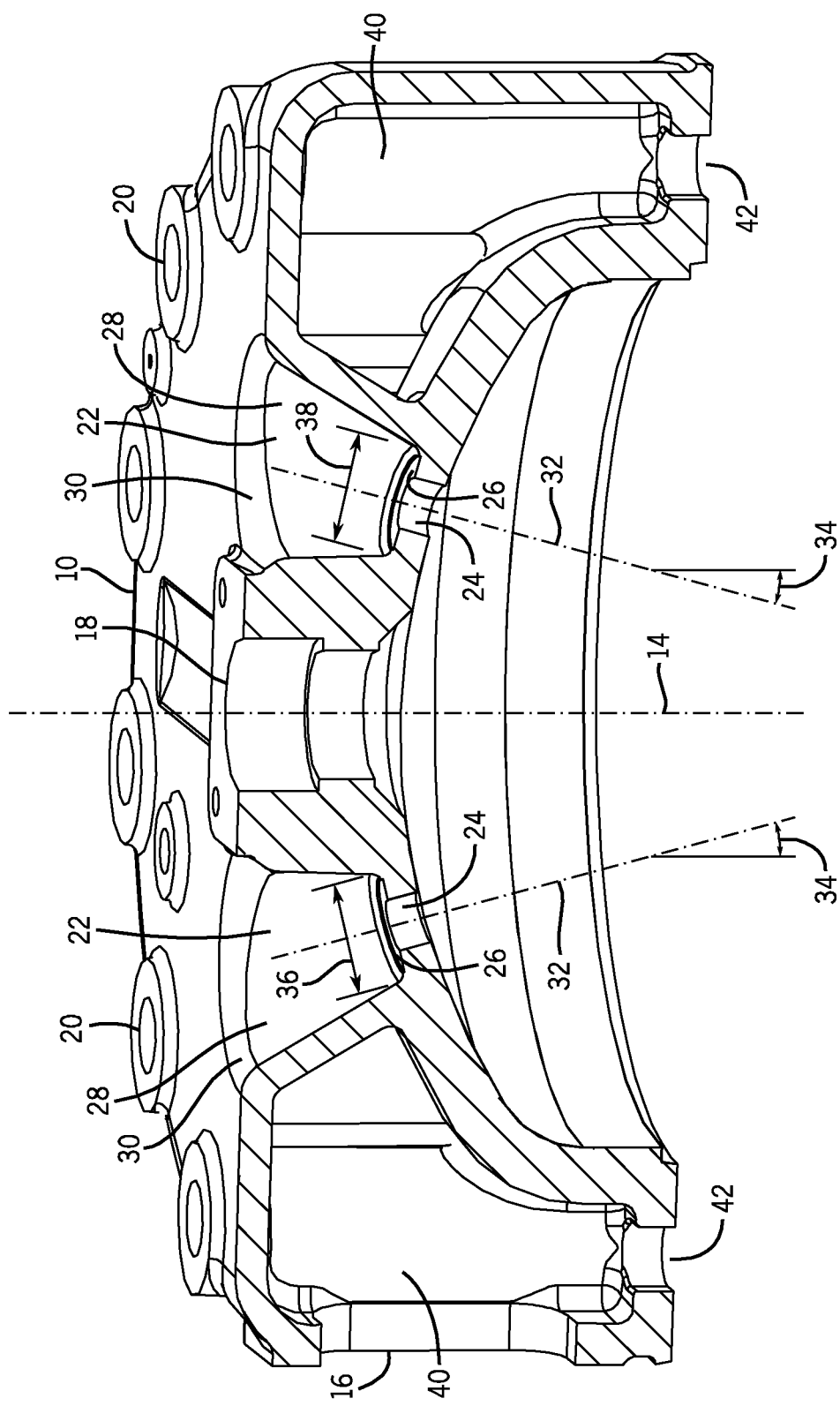
FIG. 2 is a cross-section view of the cylinder head of FIG. 1.

Additional details of the sparkplug receptacles 22 and other features of the cylinder head 10 are illustrated by FIG. 2. Each sparkplug receptacle 22 includes a generally planar base 26, a frustoconical portion 28, and a chamfer 30. The base 26 and the frustoconical portion 28 are generally concentric about an axis 32, which may be at an angle 34 with respect to the central axis 14. The angle 34 may be between 5 and 25 degrees, e.g., between 12 and 18 degrees or generally equal to 15 degrees. The frustoconical portion 28 may have a lower diameter 36 that is between 1 and 3 inches, e.g., between 1.5 and 2 inches, and an upper diameter 38 that is between 2 and 4 inches, e.g., between 3 and 3.5 inches. The distance along the axis 32 between the upper diameter 38 and the lower diameter 36 may be between 1 and 3 inches, e.g., between 2 and 2.5 inches.

FIG. 2 illustrates several other interior features of the cylinder head 10. The coolant inlet 16 leads to a chamber 40 (e.g., an annular coolant passage) that extends around the cylinder head 10. The chamber 40 is in fluid communication with a plurality of apertures 42 that connect to a cooling jacket in sidewalls of the cylinder. The bottom, interior of the cylinder head 10 defines a generally dome shaped volume 44 that forms a top part of the main combustion chamber. The portion of the cylinder head 10 adjacent the dome shaped volume 44 is cooled by coolant circulating through the chamber 40.

Figure 3:
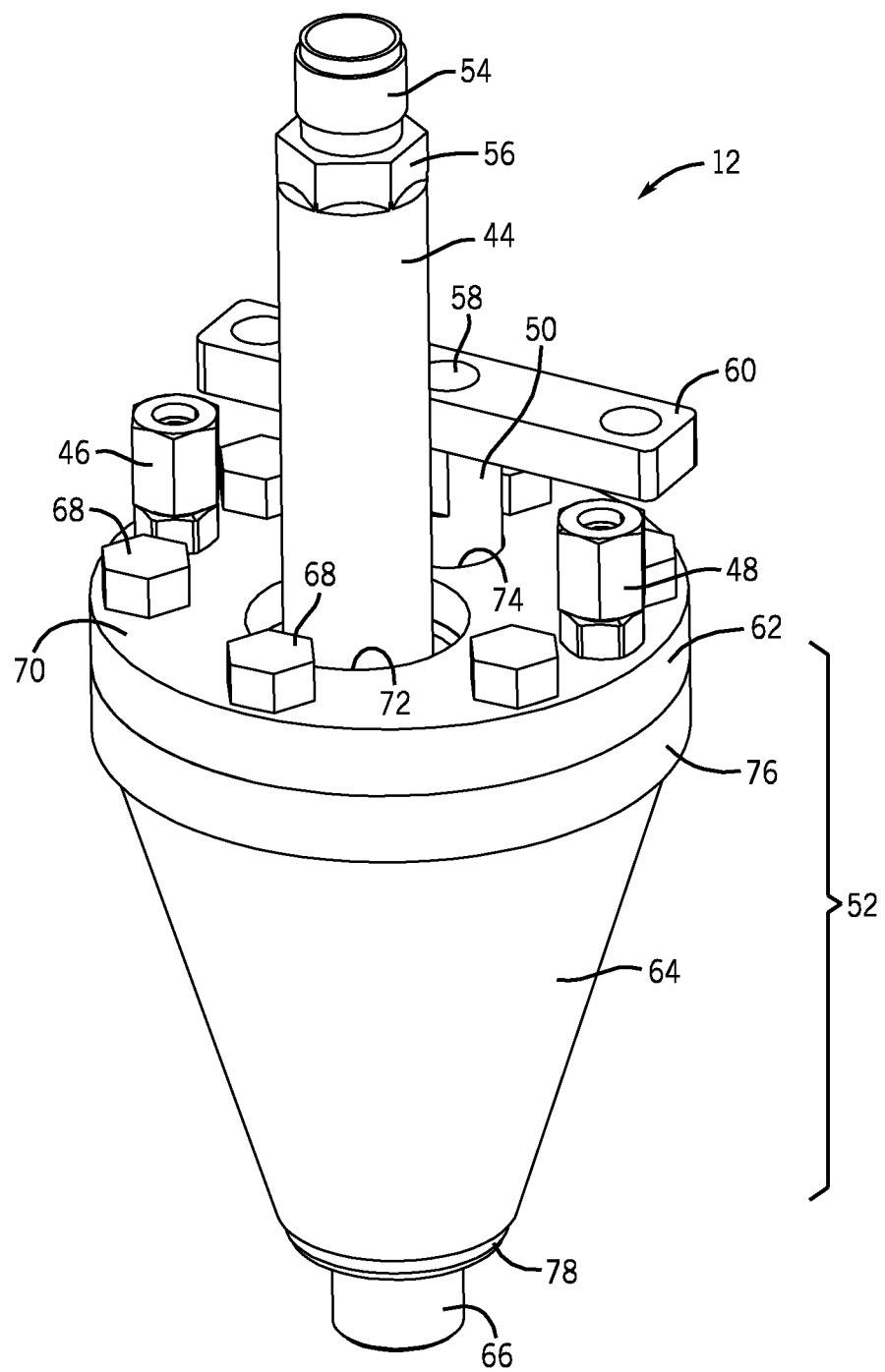
FIG. 3 is a perspective view of the pre-chamber of FIG. 1.

FIG. 3 illustrates details of the pre-chamber 12. In this embodiment, the pre-chamber 12 includes a sparkplug 44, a coolant inlet 46, a coolant outlet 48, a fuel valve 50, and a body 52. The sparkplug 44 includes an electrical interface 54 for connecting the sparkplug 44 to a power source and a hexagonal tool interface 56 for threading the sparkplug 44 to the body 52. The coolant inlet 46 and the coolant outlet 48 include a lower nut that couples them to the body 52 and an upper nut for coupling to coolant hoses. The fuel valve 50 includes a threaded fuel inlet 58 and a bracket 60 for mounting the coolant hoses. The fuel valve 50 may be a check valve that enables flow in one direction into the pre-chamber 12 and impedes flow in the opposite direction out of the pre-chamber 12.

The body 52 includes a clamping member 62, a cooling jacket 64, and a tip 66. In this embodiment, the clamping member 62 is biased against the cooling jacket 64 by a plurality of bolts 68 that are threaded to the cooling jacket 64, as discussed further below with reference to FIG. 4. The clamping member 62 has a generally flat and generally circular top face 70 and apertures 72 and 74 that extend through the top face 70 for receiving the sparkplug 44 and the fuel valve 50, respectively.

The cooling housing 64 has a generally frustoconical shape that is complementary to the sparkplug receptacle 22 described above. A generally annular flange 76 mates with the clamping member 62, and a seal 78 (e.g., annular seal) is disposed around the tip 66 adjacent the narrower portion of the cooling housing 64. The seal 78 may be made of or include a metal, such as copper, or other appropriate materials. The tip 66 defines a generally right cylindrical volume and extends from the narrower portion of the cooling housing 64. The tip 66 has external threads that are complementary to the threads in the aperture 24 for securing the pre-chamber 12 to the cylinder head 10 (FIGS. 1 and 2).

Figure 4:
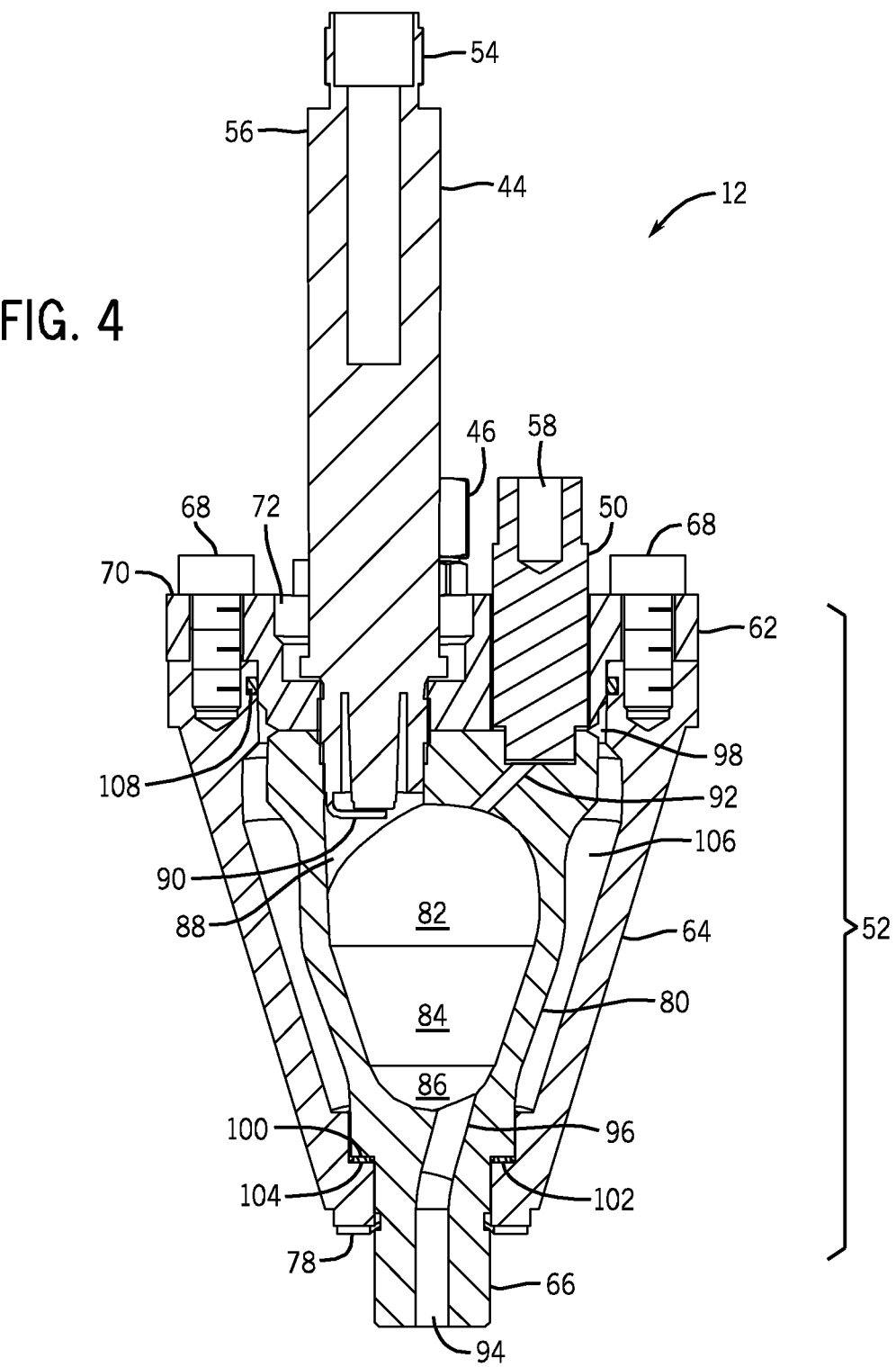
FIGS. 4-6 are cross-section views of the pre-chamber of FIG. 1.

FIG. 4 illustrates a cross-section of the pre-chamber 12. As illustrated, the clamping member 62 is connected to the tip 66 by an inner body 80. An interior of the inner body 80 defines a combustion chamber (i.e., preliminary or secondary to a main combustion chamber) with an upper zone 82, an intermediate zone 84, and a lower zone 86. The upper zone 82 generally defines a segment of a sphere that is greater than a hemisphere. The lower zone 86 generally defines a segment of a sphere that is less than a hemisphere and has a smaller diameter than the sphere segment defined by the upper zone 82. The intermediate zone 84 has a generally frustoconical shape that is generally tangent to the walls of the upper zone 82 and the lower zone 86. A geometrical configuration with the lower zone 86 smaller than the upper zone 82 facilitates fitting the pre-chamber 12 within the generally frustoconical sparkplug receptacles 22 (FIGS. 1 and 2), while maintaining a certain volume of the combustion chamber defined by zones 82, 84 and 86. In some embodiments, the volume of the combustion chamber including the zones 82, 84 and 86 is between 1% and 3% of the swept volume of the cylinder coupled to the head 10, e.g., between 1.5% and 2%. As used herein, the term "swept volume" refers to the volume through which the top surface of the piston sweeps during a stroke in the main combustion chamber.

The combustion chamber is in fluid communication with several components of the pre-chamber 12. The upper zone 82 is in fluid communication with a generally cylindrical volume 88 that receives an electrode 90 of the sparkplug 44. The volume 88 is considered part of the combustion chamber volume, along with the zones 82, 84, and 86. A passage 92 places the fuel valve 50 in fluid communication with the upper zone 82. In this embodiment, the passage 92 is angled relative to the surface of the upper zone 82, i.e., the passage 92 is not normal to the surface of the upper zone 82. The passage 92 may be at an angle relative to this surface (or a tangent line at the area of intersection) that is between 40 and 50 degrees. Another passage 94 placed in the lower zone 86 is in fluid communication with the exterior of the tip 66 and the interior of the cylinder (i.e., the main combustion chamber defined by a piston-cylinder assembly). The passage 94 includes an angled portion 96 that is angled relative to the surface of the lower zone 86. The angled portion 96 may be at an angle relative to this surface that is between 10 and 20 degrees. The passages 92 and 94 are generally parallel to a common plane, but in other embodiments, they may extend generally parallel to different planes.

The inner body 80 is secured to the clamping member 62 by a weld 98. In some embodiments, these components 80 and 62 are cast and machined separately and then welded together. In other embodiments, the inner body 80 and clamping member 62 may be integrally formed as a single component. The tip 66 may also be welded or integrally formed with the inner body 80.

The inner body 80 includes a shoulder 100 that biases a seal 102 (e.g., annular seal) against a shoulder 104 of the cooling jacket 64. To bias these components, the bolts 68 compress the clamping member 62 and the inner body 80 against the cooling jacket 64 through the shoulders 100 and 104. The compression of the inner body 80 and clamping member 62 is balanced by tension applied to the cooling jacket 64 by the bolts 68 and the shoulder 100. In this embodiment, the inner body 80 is not threaded to the cooling jacket 64, and the threaded connections to the bolts are near a distal portion of the pre-chamber 12, away from the heat of the cylinder. Positioning the threaded connections away from the cylinder (i.e., the main combustion chamber defined by a piston-cylinder assembly) is believed to keep the threaded components cooler and reduce the likelihood of the threaded components seizing to one another due to thermal cycling.

The cooling jacket 64 cooperates with an exterior of the inner body 80 to define an outer volume 106 (e.g., an annular coolant passage) configured to circulate a coolant. The outer volume 106 is sealed by the seal 102 and an O-ring 108 disposed about the clamping member 62. The seal 102 may include a graphite gasket or other appropriate materials. The O-ring 108 may be made of a less expensive material with a lower temperature rating than the seal 102. For example, the seal 102 may be rated for temperatures as high as 800 to 1000 degrees F., and the O-ring 108 may be or include Cal Res, a fluoro-carbon, or other appropriate material rated for temperatures as high as 400 or 600 degrees F.

Figure 5:
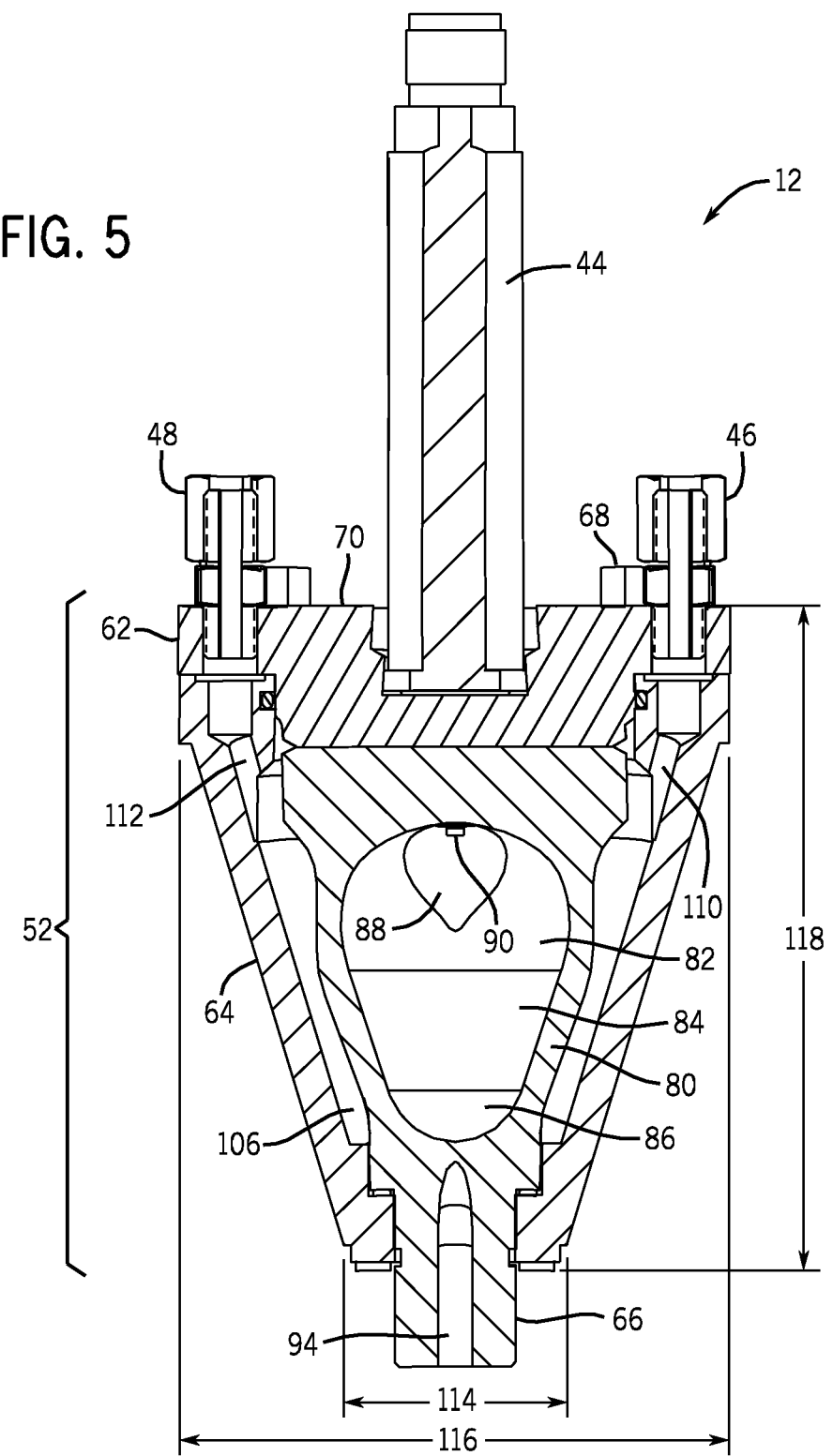

FIG. 5 illustrates a cross-section that is generally orthogonal to the cross-section of FIG. 4. As illustrated by FIG. 5, the coolant inlet 46 and the coolant outlet 48 are in fluid communication with the outer volume 106 through passages 110 and 112. These passages 110 and 112 circulate coolant through the outer volume 106, cooling the inner body 80 and removing heat from combustion within the inner body 80.

In this embodiment, the clamping member 62 and the inner body 80 may be removed from the cooling housing 64 for maintenance. Coolant circulating through the pre-chamber 12 may form deposits in the outer volume 106. Removing the clamping member 62 and the inner body 80 facilitates cleaning these deposits and potentially extends the useful life of the pre-chamber.

As mentioned above, the pre-chamber 12 is generally complementary to the sparkplug receptacle 22. To fit within the sparkplug receptacle 22 of certain engines, the pre-chamber 12 has a generally frustoconical shape with a lower width 114 that is less than 1.8 inches, e.g., less than or generally equal to 1.5 inches, and an upper width 116 that is less than 5 inches, e.g., generally equal to or less than 4 inches. The height 118 of the body 52 may be less than 5 inches, e.g., generally less than or equal to 4.3 inches.

Figure 6:
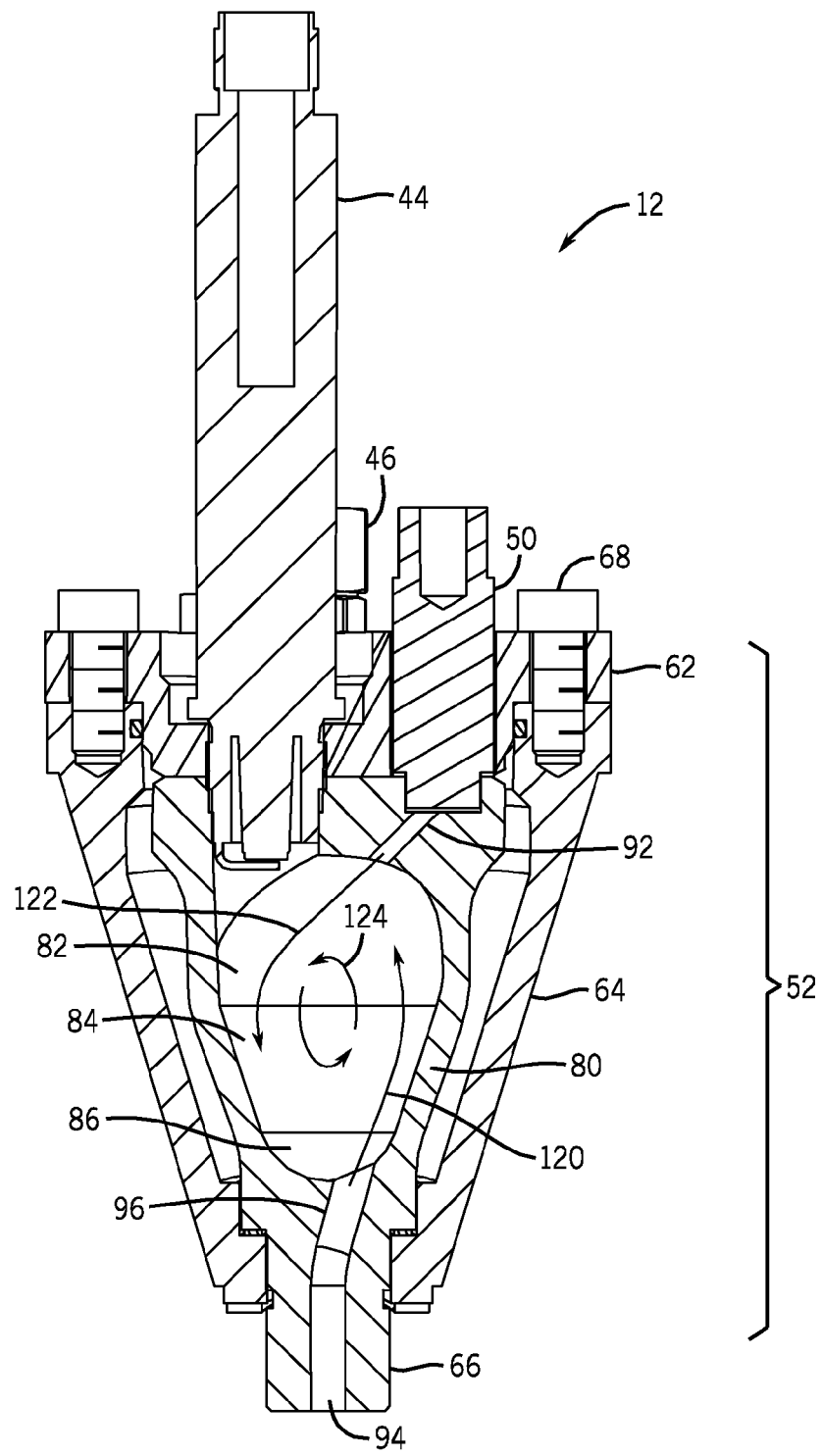

FIG. 6 illustrates fluid flow in the pre-chamber 12. In operation, the pre-chamber 12 is coupled to the cylinder of a two-stroke engine. During the compression stroke, air flows into the combustion chamber from the cylinder through the aperture 94, as illustrated by arrow 120, and fuel flows into the combustion chamber through the passage 92, as illustrated by arrow 122. As mentioned above, these passages 92 and 94 are angled to establish a swirling flow, as illustrated by arrow 124. The swirling flow may swirl about one axis or two axes, e.g., it may spiral, depending on whether the passages 92 and 94 are generally co-planar. In this embodiment, the flow generally rotates about one axis that is generally perpendicular to the cross-section of FIG. 6. The swirling flow 124 is believed to be generally laminar and is believed to enhance mixing of the fuel and air, boosting combustion.

Near the top of the piston's stroke through the cylinder, i.e., top dead center (TDC), the sparkplug 44 creates a spark in the pre-chamber, and the swirling air-fuel mixture is ignited. The resulting flame propagates through the passage 94 into the cylinder and ignites the larger volume of fuel-air mixture within the cylinder. The flame produced by the pre-chamber 12 is believed to yield more complete combustion within the cylinder and reduce emissions from the engine.

Figure 7:
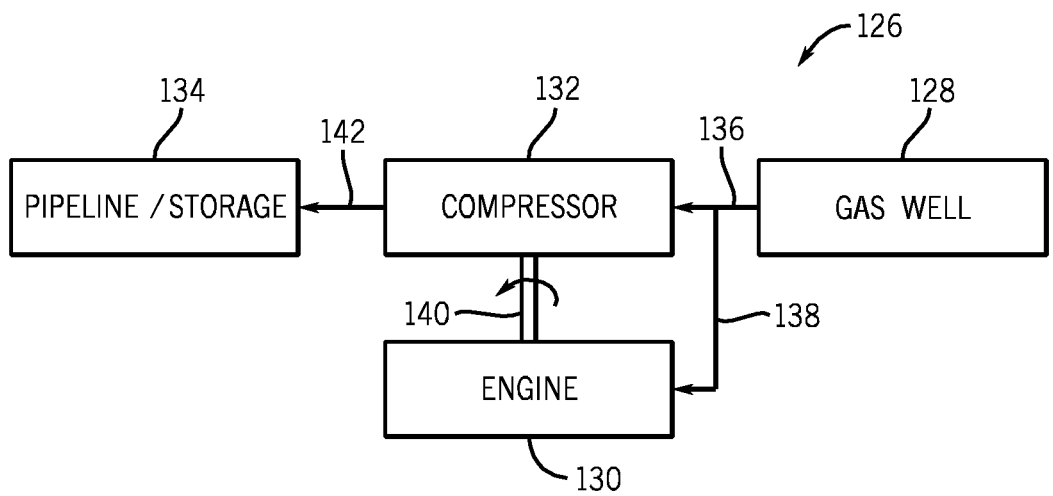
FIG. 7 illustrates a gas-compression system that includes the cylinder head and pre-chamber of FIG. 1

FIG. 7 illustrates an example of a compression system 126 that includes the pre-chamber 12 described above. The system 126 includes a natural-gas well 128, an engine 130 retrofitted with one or more of the pre-chambers 12, a compressor 132, and a pipeline, storage, or other fluid destination 134. The gas well 128 may be a subsea or a surface natural gas well. The engine 130 may be a two-stroke combustion engine having between 40 and 800 hp, e.g., between 40 and 200 hp.

In operation, natural gas flows from the gas well 128 to the compressor 132, as illustrated by arrow 136. A portion of this flow is diverted to the engine 130, as illustrated by arrow 138. The diverted flow of 138 may be conditioned by removing moisture or changing the gas pressure before being introduced to the engine 130. A small portion of the diverted gas 138 flows into the pre-chamber 12 and the rest of the diverted gas 138 flows into the cylinders of the engine 130. The engine 130 combusts the diverted fuel 138 by igniting the fuel in the pre-chambers 12, as described above, and drives a shaft 140 or other mechanical linkage that powers the compressor 132. The compressor 132 compresses the flow 136 from the gas well 128 and produces an outlet flow 142 at a higher pressure.

Because the pre-chamber 12 described above is compatible with certain types of engines that were not designed to include pre-chambers, the engine 130 may be an older design, e.g., an engine that was in existence or designed before 1995, 2000, or 2008. Retrofitting older engines with pre-chambers is believed to reduce the emissions and enhance the efficiency of these older engines, bringing the engines closer to satisfying newer emissions regulations.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising: a first pre-combustion chamber configured to removably couple to a cylinder head of an engine, wherein the first pre-combustion chamber comprises at least one of: a first cooling jacket disposed about a first inner body having a first chamber, wherein the first cooling jacket is removably coupled to the first inner body via a removable coupling; and a first frustoconical exterior extending a first distance of at least half of a first axial length of the first pre-combustion chamber from a first annular tip at a first end toward an opposite second end, wherein the first frustoconical exterior has only one angle relative to a first axis of the first pre-combustion chamber.

2. The system of claim 1, wherein the first pre-combustion chamber comprises the first cooling jacket disposed about the first inner body having the first chamber, wherein the first cooling jacket is removably coupled to the first inner body with the removable coupling.

3. The system of claim 2, wherein the removable coupling comprises threads.

4. The system of claim 2, wherein the removable coupling comprises one or more fasteners.

5. The system of claim 2, wherein the removable coupling comprises a clamp.

6. The system of claim 5, wherein the clamp is disposed adjacent axial ends of both the first cooling jacket and the first inner body.

7. The system of claim 5, wherein the clamp comprises an axial extension extending partially axially into the first cooling jacket.

8. The system of claim 7, comprising a seal disposed between the axial extension of the clamp and the first cooling jacket.

9. The system of claim 2, wherein the first inner body comprises an annular exterior portion, the first cooling jacket comprises an annular interior portion, and the annular exterior portion is removably coupled with the annular interior portion via the removable coupling at a first interface.

10. The system of claim 9, comprising a first annular seal disposed between the annular exterior portion and the annular interior portion at the first interface, wherein the first interface is disposed at a first end portion of the first pre-combustion chamber adjacent the first annular tip of the first pre-combustion chamber.

11. The system of claim 2, comprising a coolant passage disposed between the first cooling jacket and the first inner body, wherein the coolant passage is disposed between a first end portion and an opposite second end portion of the first pre-combustion chamber, the first end portion comprises a first seal, and the second end portion comprises a second seal.

12. The system of claim 1, comprising the first frustoconical exterior extending the first distance of at least half of the first axial length of the first pre-combustion chamber from the first annular tip at the first end toward the opposite second end, wherein the first frustoconical exterior has only the one angle relative to the first axis of the first pre-combustion chamber.

13. The system of claim 12, wherein the first frustoconical exterior having only the one angle extends from the first annular tip at the first end to a flange at the opposite second end.

14. The system of claim 12, wherein the first frustoconical exterior having only the one angle extends along an entire length of the first chamber.

15. The system of claim 12, comprising the cylinder head having a first receptacle, wherein the first pre-combustion chamber is removably coupled to the first receptacle, and the first receptacle comprises a first mating frustoconical portion.

16. The system of claim 15, comprising a second pre-combustion chamber removably coupled to a second receptacle in the cylinder head, the second receptacle comprises a second mating frustoconical portion, the second pre-combustion chamber comprises a second frustoconical exterior extending a second distance of at least half of a second axial length of the second pre-combustion chamber from a second annular tip at a third end toward an opposite fourth end, and the second frustoconical exterior has only one angle relative to a second axis of the second pre-combustion chamber.

17. The system of claim 1, comprising the cylinder head having the first pre-combustion chamber.

18. The system of claim 17, comprising the engine having the cylinder head with the first pre-combustion chamber.

19. The system of claim 1, wherein the first pre-combustion chamber comprises:
the first cooling jacket disposed about the first inner body having the first chamber, wherein the first cooling jacket is removably coupled to the first inner body via the removable coupling; and
the first frustoconical exterior extending the first distance of at least half of the first axial length of the first pre-combustion chamber from the first annular tip at the first end toward the opposite second end, wherein the first frustoconical exterior has only the one angle relative to the first axis of the first pre-combustion chamber.

* * * * *